United States Patent
Ambroladze et al.

(10) Patent No.: US 9,594,689 B2
(45) Date of Patent: Mar. 14, 2017

(54) DESIGNATED CACHE DATA BACKUP DURING SYSTEM OPERATION

(71) Applicant: International Business Machines Corporation, Armonk, NY (US)

(72) Inventors: Ekaterina M. Ambroladze, Los Angeles, CA (US); Deanna P. Berger, Hyde Park, NY (US); Garrett M. Drapala, Cary, NC (US); Michael Fee, Cold Spring, NY (US); Pak-kin Mak, Poughkeepsie, NY (US); Arthur J. O'Neill, Jr., Poughkeepsie, NY (US); Diana L. Orf, Natick, MA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/616,784

(22) Filed: Feb. 9, 2015

(65) Prior Publication Data
US 2016/0232099 A1    Aug. 11, 2016

(51) Int. Cl.
G06F 12/00 (2006.01)
G06F 12/08 (2016.01)
G06F 3/06 (2006.01)

(52) U.S. Cl.
CPC .......... *G06F 12/0868* (2013.01); *G06F 3/065* (2013.01); *G06F 3/0619* (2013.01); *G06F 3/0685* (2013.01); *G06F 12/0802* (2013.01); *G06F 12/0808* (2013.01); *G06F 12/0888* (2013.01); *G06F 12/0891* (2013.01); *G06F 2212/1016* (2013.01); *G06F 2212/60* (2013.01); *G06F 2212/608* (2013.01)

(58) Field of Classification Search
CPC ............. G06F 12/0868; G06F 12/0802; G06F 12/0808; G06F 12/0811; G06F 12/0888; G06F 12/0891; G06F 3/0619; G06F 3/065; G06F 3/0685; G06F 2212/1016; G06F 2212/608; G06F 2212/60
See application file for complete search history.

(56) References Cited

U.S. PATENT DOCUMENTS

| | | | |
|---|---|---|---|
| 6,047,358 A * | 4/2000 | Jacobs | G06F 12/126 711/128 |
| 6,480,975 B1 | 11/2002 | Arimilli et al. | |
| 7,055,003 B2 | 5/2006 | Cargnoni et al. | |
| 7,689,891 B2 | 3/2010 | Bell, Jr. et al. | |
| 8,280,858 B2 | 10/2012 | Ahrens et al. | |
| 8,347,176 B2 | 1/2013 | Resnick et al. | |
| 8,364,899 B2 | 1/2013 | Ambroladze et al. | |
| 8,407,191 B1 | 3/2013 | Nanda | |
| 8,640,006 B2 | 1/2014 | Carman et al. | |
| 8,645,796 B2 | 2/2014 | Ambroladze et al. | |
| 2012/0254698 A1 | 10/2012 | Özer et al. | |
| 2015/0149735 A1* | 5/2015 | Nale | G11C 11/40618 711/147 |

* cited by examiner

*Primary Examiner* — Shawn X Gu
(74) *Attorney, Agent, or Firm* — Edward J. Wixted, III

(57) ABSTRACT

In an approach for backing up designated data located in a cache, data stored within an index of a cache is identified, wherein the data has an associated designation indicating that the data is applicable to be backed up to a higher level memory. It is determined that the data stored to the cache has been updated. A status associated with the data is adjusted, such that the adjusted status indicates that the data stored to the cache has not been changed. A copy of the data is created. The copy of the data is stored to the higher level memory.

17 Claims, 4 Drawing Sheets

DESIGNATED CACHE DATA BACKUP DURING SYSTEM OPERATION

BACKGROUND

The present invention relates generally to the field of cache backup, and more particularly to backing up designated data to higher level cache or memory while allowing access to the designated data.

A cache is a component that transparently retains data elements (or simply data) so that future requests for any retained data can be served faster. A data element that is stored within a cache corresponds to a pre-defined storage location within a computer memory system. Such a data element might be a value that has recently been computed or a duplicate copy of the same data element that is also stored elsewhere. If requested data is contained in the cache, this is a cache hit, and the request can be served by simply reading the cache, which is comparatively faster than accessing other storage locations because the cache is usually built close to the respective requester. If the data is not contained in the cache, this is a cache miss, and the data is fetched from higher level cache or system memory (other storage medium) not necessarily as close to the requester, and thus comparatively slower than a cache hit. In general, the greater number of requests that can be served from the cache, the faster the overall system performance.

To ensure the validity of data in the cache, error detection and correction schemes can be used to check the data for errors. Error detection and correction schemes can be either systematic or non-systematic. In a systematic scheme, the transmitter sends the original data and attaches a fixed number of check bits (or parity data) which are derived from the data bits by some deterministic algorithm. If only error detection is required, a receiver can simply apply the same algorithm to the received data bits and compare its output with the received check bits. If the values do not match, an error has occurred at some point.

SUMMARY

Aspects of an embodiment of the present invention disclose a method, computer program product, and computer system for backing up designated data located in a cache. Data stored within an index of a cache is identified, wherein the data has an associated designation indicating that the data is applicable to be backed up to a higher level memory. It is determined that the data stored to the cache has been updated. A status associated with the data is adjusted, such that the adjusted status indicates that the data stored to the cache has not been changed. A copy of the data is created. The copy of the data is stored to the higher level memory.

DETAILED DESCRIPTION

Embodiments of the present invention recognize that technologies that allow larger and denser static random-access memory (SRAM) and embedded dynamic random-access memory (eDRAM) caches on a single chip can result in an increasing number of errors. These errors can corrupt data on the cache. Embodiments of the present invention recognize that as data remains in caches for an extended period of time, the potential of becoming corrupt increases, such that the errors may not be correctable. Embodiments of the present invention provide an approach to locate and backup designated data to higher level cache or memory, where additional error detection and correction mechanisms may exist.

The present invention will now be described in detail with reference to the Figures.

Figure 1:
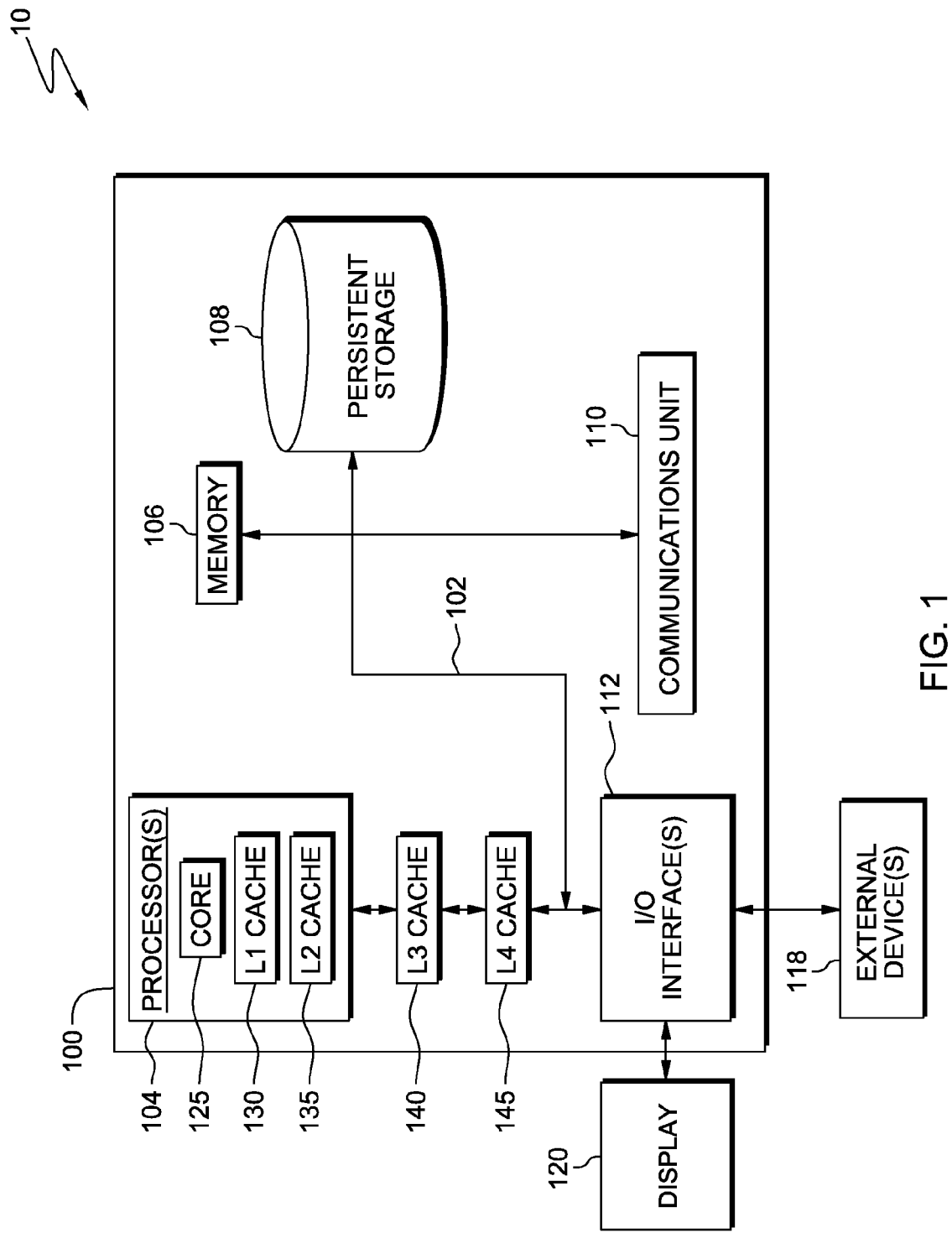
FIG. 1 is a block diagram of a data processing environment, in accordance with one embodiment of the present invention.

FIG. 1 is a functional block diagram illustrating a distributed data processing environment, generally designated 10, in accordance with one embodiment of the present invention. FIG. 1 depicts a block diagram of components of computing device 100, in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Computing device 100 may be a management server, a web server, or any other electronic device or computing system capable of receiving and sending data, and processing program instructions. In some embodiments, computing device 100 may be a laptop computer, tablet computer, netbook computer, personal computer (PC), a desktop computer, or any programmable electronic device.

Computing device 100 includes communications fabric 102, which provides communications between core 125, cache (e.g., L1 cache 130, L2 cache 135, L3 cache 140, and L4 cache 145), memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses or a crossbar switch.

Processor 104 may be a processor with one or more cores (e.g., core 125). In the depicted embodiment, processor 104 includes core 125, L1 cache 130, and L2 cache 135. Processor 104 may include any number of cache levels. Core 125 is an individual central processing unit (CPU) located on processor 104. In embodiments of the present invention, there may be any number of cores 125 within processor 104.

Memory 106 and persistent storage 108 are computer readable storage media. In this embodiment, memory 106 includes random access memory (RAM). In general, memory 106 can include any suitable volatile or non-volatile computer readable storage media.

Figure 2:
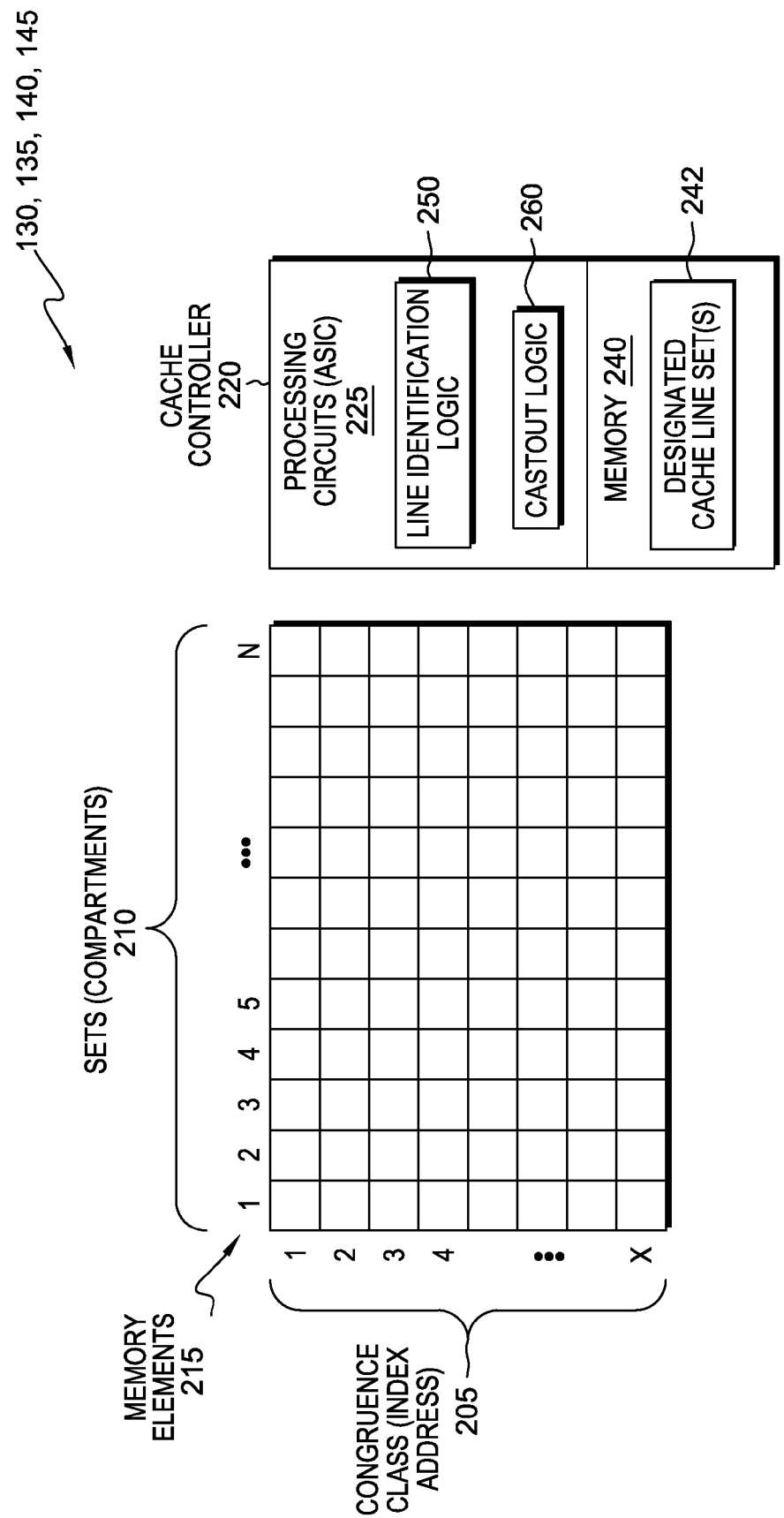
FIG. 2 depicts additional details of the caches, in accordance with one embodiment of the present invention.

Cache (e.g., L1 cache 130, L2 cache 135, L3 cache 140, and L4 cache 145) is a fast memory that enhances the performance of computer processor(s) 104 by holding recently accessed data, and data near accessed data, from memory 106. In the depicted embodiment, L1 cache 130 and L2 cache 135 are located on processor 104. In the depicted embodiment, L1 cache 130 and L2 cache 135 are on-processor memory for caching data on processor 104. Processor 104 may be operatively connected to L3 cache 140, which in turn may be operatively connected to L4 cache 145. Data retrieved from memory 106 may be cached in any of the caches (e.g., L1 cache 130, L2 cache 135, L3 cache 140, and L4 cache 145). Typically, the cache size increases as the cache level increases while the speed at which data can be accessed decreases and the cache level increase, primarily because lower level caches are located close to core 125 and/or processor 104. In the depicted embodiment, for example, L1 cache 130 is the smallest size cache and is the closest cache to core 125, while L4 cache 145 is the largest size cache and is the furthest away cache from core 125. In some embodiments, higher level caches and memory may have additional error detection and correction mechanisms. While the depicted embodiment includes L1 cache 130, L2 cache 135, L3 cache 140, and L4 cache 145, it should be understood that different cache arrangements, in both number of cache levels and location within computing device 100, are recognized by embodiments of the present invention. Further, it is recognized that some cache levels may be dedicated to core 125, while other cache levels are shared between core 125 and additional cores (not shown) of processor 104. FIG. 2 illustrates further details of L1 cache 130, L2 cache 135, L3 cache 140, and/or L4 cache 145, in accordance with an embodiment of the present invention.

Programs may be stored in persistent storage 108 and in memory 106 for execution by one or more of the respective computer processors 104 via L1 cache 130, L2 cache 135, L3 cache 140, and/or L4 cache 145. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Programs may be downloaded to persistent storage 108 through communications unit 110.

I/O interface(s) 112 allows for input and output of data with other devices that may be connected to computing device 100. For example, I/O interface 112 may provide a connection to external devices 118 such as a keyboard, keypad, a touch screen, and/or some other suitable input device. External device(s) 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to a display 120.

Display 120 provides a mechanism to display data to a user and may be, for example, a computer monitor.

FIG. 2 illustrates further details of L1 cache 130, L2 cache 135, L3 cache 140, and/or L4 cache 145, in accordance with one embodiment of the present invention. As discussed herein, reference is made to L3 cache 140. However, the explanation may apply to L1 cache 130, L2 cache 135, and L4 cache 145, in embodiments of the invention.

L3 cache 140 (along with L1 cache 130, L2 cache 135, and L4 cache 145) may be an N-way set associative cache with 1-X congruence classes 205 (shown as rows) and 1-N sets 210 (shown as columns) as understood by one skilled in the art. As discussed herein, each congruence class 205 can also be referred to as an addressable index (or index) 205, and each set 210 can be referred to as a compartment 210.

In the depicted example, L3 cache 140 is a twelve-way set associative cache. There may be fewer or additional sets (compartments) 210 in the cache. Twelve sets are used for explanation purposes.

L3 cache 140 has numerous memory elements 215, each of which stores data. The memory elements 215 also referred to as memory cells are integrated circuits for storing data. L3 cache 140 also includes a cache controller 220 that controls loading (writing), evicting, and reading (requesting) data in the memory elements 215 of the L3 cache 140. L3 cache 140 includes a cache directory (not shown) which maintains the state of each set (compartment) 210. The cache directory may, for example, store information about data stored to cache, such as, but not limited to, whether the data is designated as data to be backed up to higher level cache or memory 106, and whether the data has been changed. Data may be given such a designation by a user of computing device 100, or alternatively, by various software running on computing device 100. A user (or software) may elect to give data such as designation because, for example, the data is necessary for the system to operate. Cache controller 220 controls and makes updates to the cache directory as well as memory elements 215.

The cache directory may have, for example, a grid of status indications, where each individual status indication represents a corresponding memory element 215 in the cache (e.g., L1 cache 130, L2 cache 135, L3 cache 140, and L4 cache 145). Each set (compartment) 210 has corresponding bits that indicate the status: valid, invalid, empty, owned, offline, a designation that the data is to be backed up to higher level cache or memory 106 (see above), an indication that the data has/has not been changed, etc.

Cache controller 220 may include processing circuits 225, which may be application specific integrated circuits (ASIC) and various state machines (not shown). A state machine (e.g., finite-state machine (FSM) or finite-state automaton) reads a series of inputs. When the state machine reads an input it will switch to a different state. Each state specifies which state to switch for a given input.

For example, a state machine is a mathematical model used to design computer programs and digital logic circuits. A state machine can be in one of a finite number of states. A state machine is only one state at a time, and the state the state machine is in at any given time is called the current state. The state can change from one state to another when initiated by a triggering event or condition, and this is called a transition. Each particular state machine is defined by a list of the possible transition states from each current state and by the triggering condition for each transition.

Various state machines have different roles that the various state machines are designed to fulfill. Various state machines may be used by a transaction or operation to access data stored in memory elements 215. Various state machines can access memory elements 215 (i.e., access the cache) for processor 100 (e.g., core 125, an application in memory 106)

Cache controller 220 includes memory 240. Memory 240 is a storage location accessible to cache controller 220, and in some embodiments is located on cache controller 220. In the depicted embodiment, memory 240 stores designated cache line set(s) 242.

Designated cache line set(s) 242 is an indication of the sets 210 of a particular index 205 that contain cache lines (data) that have been designated as to be backed up to higher level cache or memory 106. Generally, designated cache line set(s) 242 is a representation of the identified sets 210 of a particular index 205 that contain cache lines (data) that have been designated as to be backed up to higher level cache or memory 106, as identified by line identification logic 250 (see FIG. 3).

For each set (compartment) 210, the cache directory contains information about the status indication of the corresponding memory element 215. Each of the directory statuses for sets 1-N in a specific congruence class (index) 205 are read out each time a state machine or logic (e.g., hardware logic, software logic) accesses L3 cache 140. In one embodiment, each of the directory statuses for a section of L3 cache 140 are read out each time a state machine or logic accesses the section of L3 cache 140.

Cache controller 220 includes line identification logic 250. Line identification logic 250 operates to identify sets 210 of indexes 205 containing cache lines (data) designated to be backed up to higher level cache or memory 106, and to initiate castout logic 260 for each identified set 210. Line identification logic 250 may be hardware or software logic. In some embodiments, line identification logic is executed by cache controller 220 which can include various state machines that may be configured to perform the actions.

Cache controller 220 includes castout logic 250. Castout logic 250 operates to, responsive to being initiated by line identification logic 250, copy (e.g., take a snapshot of) a backup of cache lines (data) to higher level cache or memory 106. In some embodiments, castout logic 250 only backs up cache lines (data) to a higher level cache or memory 106 if the respective cache line has been changed in relationship to a higher level cache or memory copy of the cache line (data) already in existence. Castout logic 250 also operates to, reset the indication stating that the cache line has been changed (e.g., respective to higher level cache or memory 106). In some embodiments, such an indication may be within the cache directory. Castout logic 250 may be hardware or software logic. In some embodiments, castout logic 250 is executed by cache controller 220 which can include various state machines that may be configured to perform the actions.

Figure 3:
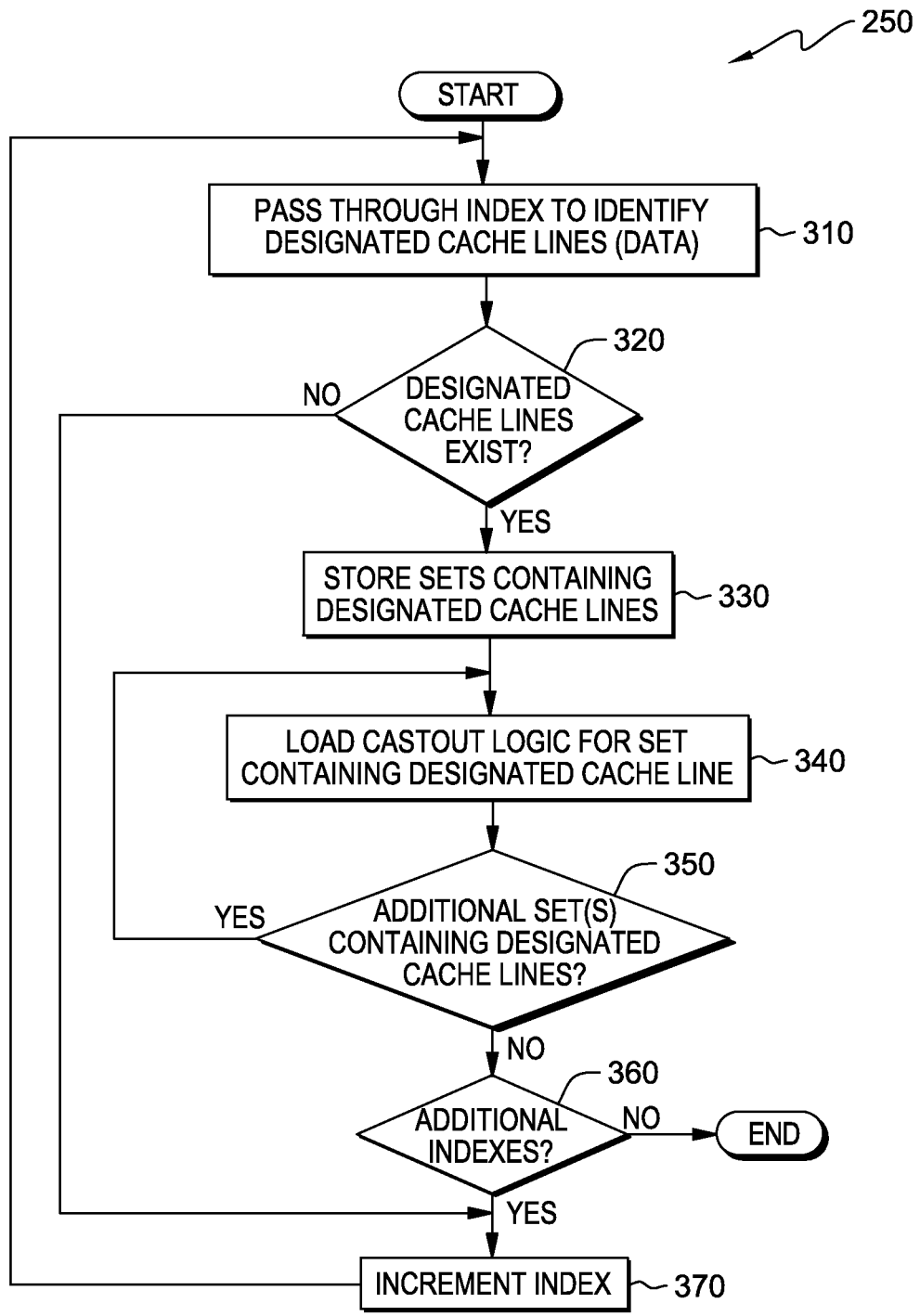
FIG. 3 depicts a flowchart of the steps of line identification logic executing within the data processing environment of FIG. 1, for identifying designated cache lines and initiating castout logic for identified designated cache lines, in accordance with one embodiment of the present invention.

FIG. 3 depicts a flowchart of the steps of a line identification logic, executing within L1 cache 130, L2 cache 135, L3 cache 140, or L4 cache 145, as shown in FIG. 2. Line identification logic 250 operates to identify sets 210 of indexes 205 containing cache lines (data) designated to be backed up to higher level cache or memory 106. Line identification logic 250 also operates to initiate castout logic 260 for each identified set 210. As described above, line identification logic 250 may be executed by cache controller 220 which can include various state machines configured to perform the actions. As discussed herein, reference is made to L3 cache 140. However, the explanation may apply to L1 cache 130, L2 cache 135, and L4 cache 145, in embodiments of the invention.

In one embodiment, initially data may be designated as data to be backed up to higher level cache or memory 106. Such a designation may be associated with particular data, and upon storing the data to L3 cache 140, the designation may be stored to the cache directory. In some embodiments, a user associates such a designation with particular data. In other embodiments, software on computing device 100 associates such a designation with particular data. In some embodiments, such a designation is associated with particular data because the particular data is critical for operations running on computing device 100.

In some embodiments, line identification logic 250 is initiated as a result of activity in L3 cache 140. In other embodiments, line identification logic 250 is enabled via commands issued by processor 104, or core 125.

In step 310, line identification logic 250 passes through an index 205 to identify cache lines (data) designated as data to be backed up to higher level cache or memory 106. In some embodiments, line identification logic 250 accesses the cache directory to identify cache lines (data) within the current index 205 designated as data to be backed up to higher level cache or memory 106. As described above, the cache directory may indicate which sets 210 include data to be backed up to higher level cache or memory 106 for the current index 205.

In decision 320, line identification logic 250 determines whether cache lines (data) exist in the current index 205 that are designated as data to be backed up to higher level cache or memory 106. Line identification logic 250 may determine whether cache lines (data) exist in the current index 205 that are designated as data to be backed up to higher level cache or memory 106 as a result of the pass through and/or check of the cache directory described above (see step 310). If no cache lines (data) were identified as being data designated to be backed up to a higher level cache or memory 106, line identification logic 250 will determine that designated cache lines (data) do not exist for the current index 205 (decision 320, no branch). If line identification logic 250 determines that designated cache lines do not exist for the current index 205 (decision 320, no branch), line identification logic 250 increments to the next index 205 (see step 370). If line identification logic 250 determines that designated cache lines do exist for the current index 205 (decision 320, yes branch), line identification logic 250 stores each set 210 containing such designated cache lines (data) (see step 330).

In step 330, line identification logic 250 stores each set 210 containing a designated cache line (data). In some embodiments, line identification logic 250 stores each set 210 containing a designated cache line (data) as designated cache line set(s) 242 to memory 240 of cache controller 220.

In step 340, line identification logic 250 loads castout logic, such as castout logic 260, for a set 210 containing a designated cache line (data). As described with reference to FIG. 4, castout logic 260 operates to copy (e.g., take a snapshot of) a backup of cache lines (data) to higher level cache or memory 106. In some embodiments, castout logic 260 only backs up cache lines (data) to a higher level cache or memory 106 if the respective cache line has been changed in relationship to a higher level cache or memory copy of the cache line (data) already in existence. Castout logic 260 also operates to, reset the indication stating that the cache line has been changed (e.g., respective to higher level cache or memory 106). In some embodiments, such an indication may be within the cache directory.

In decision 350, line identification logic 250 determines whether additional sets 210 exist within the current index 205 that contain data that has been designated to be backed up to higher level cache or memory 106. Line identification logic 250 may determine whether additional sets 210 exist within the current index 205 that contain data that has been designated to be backed up to higher level cache or memory 106 by comparing the total number of identified cache lines (data) designated as data to be backed up to higher level cache or memory 106 (see step 310) to the number of instances of castout logic 260 already loaded by line identification logic 250 (see step). If line identification logic 250 determines that additional sets 210 exist (i.e., line identification logic 250 has not yet loaded a castout logic, such as castout logic 260, for one or more additional sets 210 within the current index 205) within the current index 205 that contain data that has been designated to be backed up to higher level cache or memory 106 (decision 350, yes branch), line identification logic 250 loads castout logic, such as castout logic 260 for an additional set 210 within the current index 205 (see step 340). If line identification logic 250 determines that additional sets 210 do not exist (i.e., line identification logic 250 has already loaded a castout logic, such as castout logic 260, for all sets 210 within the current index 205 containing data that has been designated to be backed up to higher level cache or memory 106) within the current index 205 that contain data that has been designated to be backed up to higher level cache or memory 106 (decision 350, no branch), line identification logic determines whether there are additional indexes 205 in L3 cache 140 (see decision 360). In some embodiments the line identification logic 250 may also choose to limit the total number of instances of castout logic 260 to load on a particular pass through index 205 based on a programmable count in order minimize any performance impact to normal operations of the cache.

In decision 360, line identification logic 250 determines whether there are additional indexes 205 in L3 cache 140 (i.e., whether there are additional indexes 205 in L3 cache 140 through which line identification logic 250 has not yet passed through). In some embodiments, line identification logic 250 may determine whether there are additional indexes 205 in L3 cache 140 by accessing the cache directory, which may include the number of indexes 205 in L3 cache 140. If line identification logic 250 determines that there are not additional indexes 205 in L3 cache 140 (decision 360, no branch), the process is complete. If line identification logic 250 determines that there are additional indexes 205 in L3 cache 140 (decision 360, yes branch), line identification logic 250 increments to the next index 205

In step 370, line identification logic 250 increments to the next index 205. In some embodiments, line identification logic 250 increments the index 205 in a sequential order (i.e., 1, 2, 3 . . . X). In other embodiments, line identification logic 250 may select the next index 205 by another method. Upon incrementing to and selecting the next index 205, line identification logic 250 proceeds to pass through the next index 205 to identify cache lines (data) designated as data to be backed up to higher level cache or memory 106 (see step 310), and proceeds as described above.

In some embodiments, a timer may additionally run as line identification logic 250 operates according to the steps described above. The timer may specify a designated time frame, or preselected time interval, within which identification logic 250 operates within each index 205. In some embodiments, the timeframe for the timer is specified by a user of computing device 100. In other embodiments, the timeframe for the timer is specified by software (not shown) or cache controller 220. In general, if the timer runs out of time (e.g., the preselected time interval is reached) while line identification logic 250 continues to operate within an index 205 (e.g., line identification logic 250 has not yet completed loading castout logic 260 for each set 210 containing a designated cache line in the index 205), line identification logic 250 will proceed to increment the index 205 and proceed to the next index 205. In some circumstances, this may occur prior to storing a copy of the data to higher level cache or memory 106. In addition, in some embodiments, if line identification logic 250 completes operation for the current index 205 and is set to increment to the next index 205, line identification logic 250 may wait and only increment the index 205 once the timer runs out of time. Using a timer may enable embodiments of the present invention to more evenly access each index 205 of L3 cache 140 and step through each index 205 at a predetermined rate, rather than create a disparity between the amounts of time line identification logic 250 operates in each index 205. Use of such a timer may prevent line identification logic 250 from overburdening available bandwidth for particular indexes 205.

Figure 4:
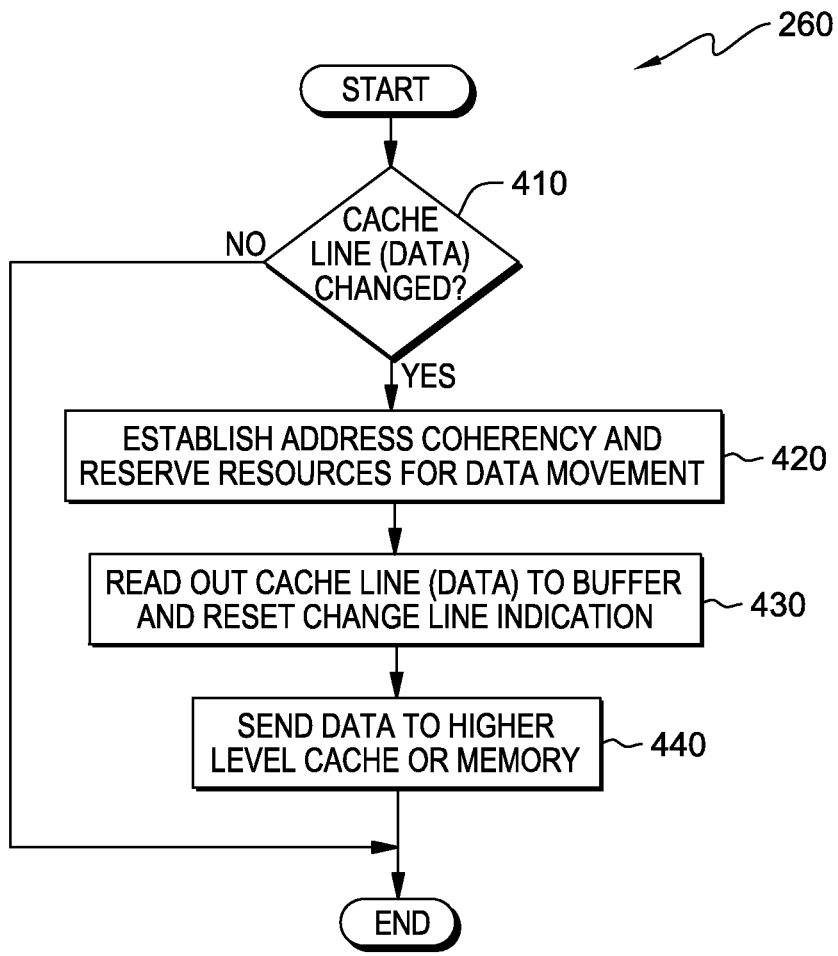
FIG. 4 depicts a flowchart of the steps of castout logic executing within the data processing environment of FIG. 1, for storing a copy of designated cache lines to higher level cache or memory, in accordance with one embodiment of the present invention.

FIG. 4 depicts a flowchart of the steps of a castout logic, executing within L1 cache 130, L2 cache 135, L3 cache 140, or L4 cache 145, as shown in FIG. 2. Castout logic 260 operates to, responsive to being initiated by line identification logic 250, copy (e.g., take a snapshot of) a backup of cache lines (data) to higher level cache or memory 106. In some embodiments, castout logic 260 only backs up cache lines (data) to a higher level cache or memory 106 if the respective cache line has been changed in relationship to a higher level cache or memory copy of the cache line (data) already in existence. Castout logic 260 also operates to, reset the indication stating that the cache line has been changed (e.g., respective to higher level cache or memory 106). In some embodiments, such an indication may be within the cache directory. As described above, castout logic 260 may be executed by cache controller 220 which can include various state machines configured to perform the actions. As discussed herein, reference is made to L3 cache 140. However, the explanation may apply to L1 cache 130, L2 cache 135, and L4 cache 145, in embodiments of the invention.

In one embodiment, initially, castout logic 260 is initiated by line identification logic 250 (see FIG. 3, step 340). In some embodiments, line identification logic 250 will initiate an instance of castout logic 260 for each set containing a cache line (data) designated as data to be backed up to higher level cache or memory 106.

In decision 410, castout logic 260 determines whether the set 210 containing the cache line (data) designated as data to be backed up to higher level cache or memory 106 has been changed in relation to an associated higher level cache or memory 106 storage location of the data (e.g., an already existing copy of the data). In some embodiments, a change line indication may exist within the cache directory indicating whether or not a processor (e.g., processor 104, core 125) has changed the cache line (data) stored in a particular set 210 of the index 205. In such an embodiment, castout logic 260 accesses the cache directory for the current set 210 to determine whether the set 210 containing the cache line (data) has been changed. If castout logic 260 determines that the set 210 containing the cache line (data) designated as data to be backed up to higher level cache or memory has not been changed (decision 410, no branch), the process is complete. There is no need to back up the data since it is already backed up to higher level cache or memory 106. If castout logic 260 determines that the set 210 containing the cache line (data) designated as data to be backed up to higher level cache or memory has been changed (decision 410, yes branch), castout logic establishes address coherency and reserves resources for data copy and movement (see step 420).

In step 420, castout logic 260 establishes address coherency and reserves resources for data copy and movement. Castout logic 260 establishes address coherency by a protection that indicates the address containing the cache line (data) is otherwise inaccessible to operations that select any set 210 of the index 205. Operations that request, or target, specific cache lines, such as processor stores, may proceed. Castout logic 260 further reserves resources for data copy and movement to higher level cache or memory 106 to store out the data. Castout logic 260 may not be able to establish address coherency and/or reserve resources if, for example, another component is currently accessing or otherwise using the higher level cache or memory 160. In some embodiments, if castout logic 260 is unable to establish address coherency and/or reserve resources for data copy and movement, castout logic 260 retries establishing address coherency and reserving resources for data copy and movement. In other embodiments, if castout logic 260 is unable to establish address coherency and/or reserve resources for data copy and movement, castout logic 260 does not finish the operation, and the data is not backed up to higher level cache or memory 106.

In step 430, castout logic 260 reads out the cache line (data) to a buffer (not shown) and resets the change line indication. Generally, a copy (e.g., a snapshot) of the cache line (data) is read out to the buffer, while the original copy of the cache line (data) remains at the respective index 205 and set 210. In some embodiments, the buffer is a buffer accessible to cache controller 220 and castout logic 260 to temporarily store the cache line (data) until the data is transferred to higher level cache or memory 106. Generally, resetting the change line indication refers to resetting the change line indication in the cache directory to indicate that the cache line (data) for the particular index 205 and set 210 has not been changed respective to at least one copy of the cache line (data) stored to higher level cache and/or memory 106. Causing the change line indication to reflect that that cache line (data) has not been changed allows, for example, future instances of castout logic 260, as well as other types of logic, to recognize that the cache line (data) has not been modified.

In step 440, castout logic 260 sends the data to higher level cache or memory 106. Castout logic 260 sends the data to higher level cache or memory so long as resource and pipeline availability exist to perform the necessary operation. In some embodiments, upon, or after, castout logic 260 sends the data to higher level cache or memory 106, castout logic 260 removes the protection from the address containing the cache line (data) (see step 420). Depending on the circumstances, castout logic 260 may not be able to send the data to higher level cache or memory 106. For example, if a processor (e.g., processor 104 core 125) is in the process of performing a store operation before castout logic 260 has sent the data to higher level cache or memory 106, castout logic 260 may not have enough time to read out the data without interrupting the store operation. In some embodiments, castout logic 260 is configured to retry the attempt, and that data is once again read out to a buffer (see step 430). In other embodiments, castout logic 260 does not finish the operation. If the operation is unable to be finished, the data will not be stored to higher level cache or memory 106, and, in some embodiments, castout logic 260 will adjust the change line indication to indicate that the data has been changed and does not have a respective copy stored to higher level cache or memory 106.

Castout logic 260 may not be able to establish address coherency and/or reserve resources if, for example, another component is currently accessing or otherwise using the higher level cache or memory 160. In some embodiments, if castout logic 260 is unable to establish address coherency and/or reserve resources for data copy and movement, castout logic 260 retries establishing address coherency and reserving resources for data copy and movement. In other embodiments, if castout logic 260 is unable to establish address coherency and/or reserve resources for data copy and movement, castout logic 260 does not finish the operation, and the data is not backed up to higher level cache or memory 106.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for backing up designated data located in a cache, the method comprising:
   identifying data stored within an index of a cache, wherein the data has an associated designation indicating that the data is applicable to be backed up to a higher level memory;
   determining that the data stored to the cache has been updated;
   adjusting a status associated with the data, such that the adjusted status indicates that the data stored to the cache has not been changed;
   creating a copy of the data; and
   storing the copy of the data to the higher level memory;
   determining that no additional data stored within the index of the cache has an associated designation indicating that the additional data is applicable to be backed up to the higher level memory; and
   incrementing to a next index.

2. The method of claim 1, wherein the higher level memory is a higher level cache.

3. The method of claim 1, further comprising:
   placing a protection on the index; and
   responsive to storing the copy of the data to the higher level memory, removing the protection on the index.

4. The method of claim 3, wherein the protection on the index prevents operations that can select any set in the index from processing, and allows operations that target specific data in the index to proceed.

5. The method of claim 1, wherein the higher level memory has additional error detection and correction mechanisms as compared to the cache.

6. The method of claim 1, further comprising:
   setting a timer based on a preselected time interval;
   determining that the additional data stored within the index of the cache has an associated designation indicating that the the additional data is applicable to be backed up to the higher level memory;
   receiving an indication that the timer has reached the preselected time interval; and
   responsive to the indication that the timer has reached the preselected time interval, incrementing to a next index prior to storing a copy of the additional data to the higher level memory.

7. A computer program product for backing up designated data located in a cache, the computer program product comprising:
one or more computer readable storage media and program instructions stored on the one or more computer readable storage media, wherein the computer readable storage media are not transitory signals per se, the program instructions comprising:
program instructions to identify data stored within an index of a cache, wherein the data has an associated designation indicating that the data is applicable to be backed up to a higher level memory;
program instructions to determine that the data stored to the cache has been updated;
program instructions to adjust a status associated with the data, such that the adjusted status indicates that the data stored to the cache has not been changed;
program instructions to create a copy of the data; and
program instructions to store the copy of the data to the higher level memory;
program instructions to determine that no additional data stored within the index of the cache has an associated designation indicating that the additional data is applicable to be backed up to the higher level memory; and
program instructions to increment to a next index.

8. The computer program product of claim 7, wherein the higher level memory is a higher level cache.

9. The computer program product of claim 7, the program instructions further comprising:
program instructions to place a protection on the index; and
program instructions to, responsive to storing the copy of the data to the higher level memory, remove the protection on the index.

10. The computer program product of claim 9, wherein the protection on the index prevents operations that can select any set in the index from processing, and allows operations that target specific data in the index to proceed.

11. The computer program product of claim 7, wherein the higher level memory has additional error detection and correction mechanisms as compared to the cache.

12. The computer program product of claim 7, the program instructions further comprising:
program instructions to set a timer based on a preselected time interval;
program instructions to determine that additional data stored within the index of the cache has an associated designation indicating that the additional data is applicable to be backed up to the higher level memory;
program instructions to receive an indication that the timer has reached the preselected time interval; and
program instructions to, responsive to the indication that the timer has reached the preselected time interval, increment to a next index prior to storing a copy of the additional data to the higher level memory.

13. A computer system for backing up designated data located in a cache, the computer system comprising:
one or more computer processors, one or more computer readable storage media, and program instructions stored on the computer readable storage media for execution by at least one of the one or more processors, the program instructions comprising:
program instructions to identify data stored within an index of a cache, wherein the data has an associated designation indicating that the data is applicable to be backed up to a higher level memory;
program instructions to determine that the data stored to the cache has been updated;
program instructions to adjust a status associated with the data, such that the adjusted status indicates that the data stored to the cache has not been changed;
program instructions to create a copy of the data; and
program instructions to store the copy of the data to the higher level memory;
program instructions to determine that no additional data stored within the index of the cache has an associated designation indicating that the additional data is applicable to be backed up to the higher level memory; and
program instructions to increment to a next index.

14. The computer system of claim 13, wherein the higher level memory is a higher level cache.

15. The computer system of claim 13, the program instructions further comprising:
program instructions to place a protection on the index; and
program instructions to, responsive to storing the copy of the data to the higher level memory, remove the protection on the index.

16. The computer system of claim 15, wherein the protection on the index prevents operations that can select any set in the index from processing, and allows operations that target specific data in the index to proceed.

17. The computer system of claim 13, wherein the higher level memory has additional error detection and correction mechanisms as compared to the cache.

* * * * *